United States Patent [19]

Bloom

[11] Patent Number: 4,864,478

[45] Date of Patent: Sep. 5, 1989

[54] INTEGRATED-MAGNETICS POWER CONVERTER

[76] Inventor: Gordon E. Bloom, 115 Duran Dr., San Rafael, Calif. 94903

[21] Appl. No.: 137,550

[22] Filed: Dec. 23, 1987

[51] Int. Cl.$^4$ .......................................... H02M 3/335
[52] U.S. Cl. ..................................... 363/16; 363/47; 336/170; 336/215; 323/362
[58] Field of Search ................... 336/170, 171, 215; 323/355, 362; 363/16, 20, 21, 24, 25, 26, 40, 47

[56] References Cited

U.S. PATENT DOCUMENTS

| | | | |
|---|---|---|---|
| 3,175,175 | 3/1965 | Hauck | 323/355 |
| 3,553,620 | 1/1971 | Cielo et al. | 363/25 |
| 3,694,726 | 9/1972 | Cielo et al. | 363/25 |
| 4,257,087 | 3/1981 | Cuk | 363/16 |
| 4,262,328 | 4/1981 | Bloom et al. | 363/16 |
| 4,355,352 | 10/1982 | Bloom et al. | 363/16 |
| 4,538,219 | 8/1985 | Morris et al. | 363/26 |
| 4,561,046 | 12/1985 | Kuster | 363/21 |
| 4,675,796 | 6/1987 | Gautherin et al. | 363/20 |
| 4,675,797 | 6/1987 | Viniciarelli | 363/21 |
| 4,688,160 | 8/1987 | Fraidlin | 363/21 |
| 4,706,181 | 11/1987 | Mercer | 363/24 |
| 4,734,839 | 3/1988 | Barthold | 363/21 |

OTHER PUBLICATIONS

"Modern DC-to-DC Switchmode Power Converter Circuits", by R. Severns et al, Van Nostrand Reinhold Company, 1985.
"Advances in Switched-Mode Power Conversion", by R. D. Middlebrook et al; TESLAco, Pasadena, Calif. (1983); see Chapters 28 (vol. 2) and Chapters 2, 15, and 21 (Vol. 3).
"Soft Ferrites, Properties and Applications", by E. C. Snelling (Chapter 6), ILIFFE Books Ltd of London (1969).
"Core Selection for and Design Aspects of an Integrated-Magnetic Forward Converter", by E. Bloom, IEEE Applied Power Electronics Conference, New Orleans Conference Proceedings, Apr. 1986, pp. 141-150.
"New Integrated-Magnetic DC-DC Power Converter Circuits and Systems," by E. Bloom, IEEE Applied Power Electronics Conference, San Diego, Conference Proceedings, Mar. 2, 1987, pp. 57-66.
"Integrated Magnetics Versus Conventional Power Filtering", by S. Cuk, IEEE Catalog No. 87 CH2477, dated 8/87, 1987 INTELEC Conference.

Primary Examiner—Patrick R. Salce
Assistant Examiner—Jeffrey L. Sterrett

[57] ABSTRACT

Novel switched mode boost-buck integrated magnetic power converters are disclosed featuring two winding bobbins, a new boost section with enhanced gain, means for operating the converter in a continuous mode of energy storage under minimum output loading conditions while providing adequate time for removing the magnetization energy of the transformer part of the integrated magnetics, and other new and different converter topologies.

55 Claims, 11 Drawing Sheets

FIG. 1
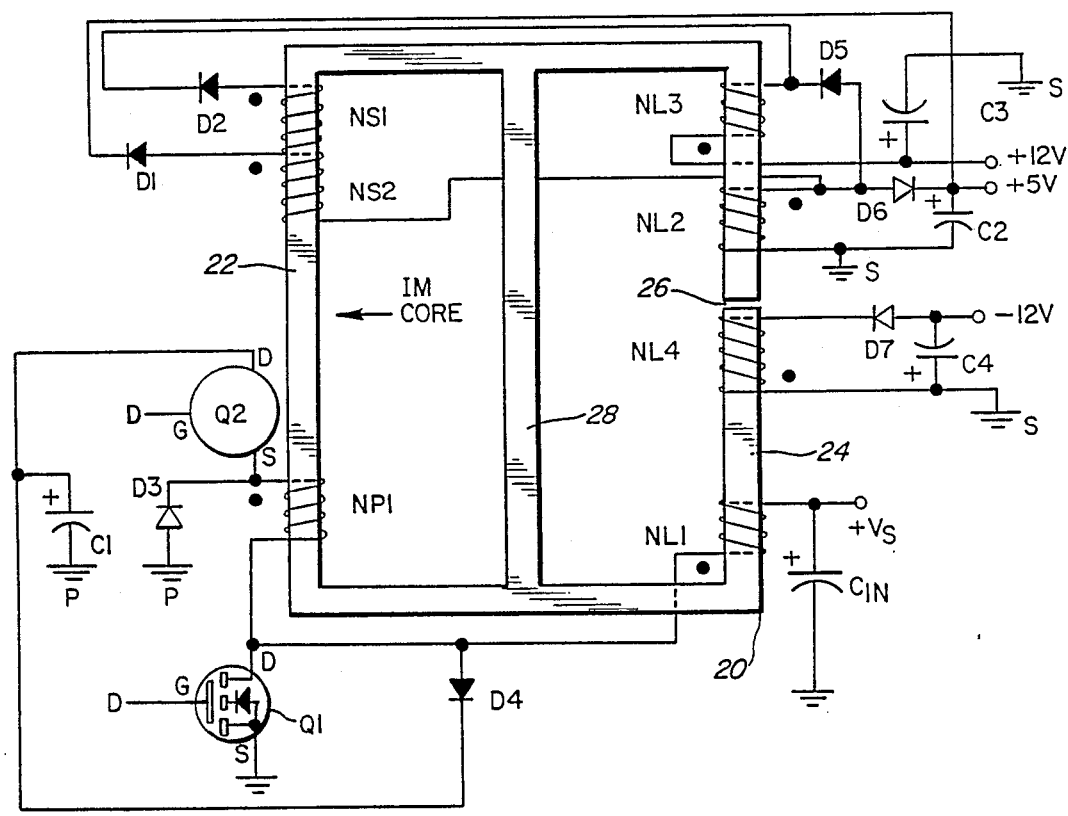
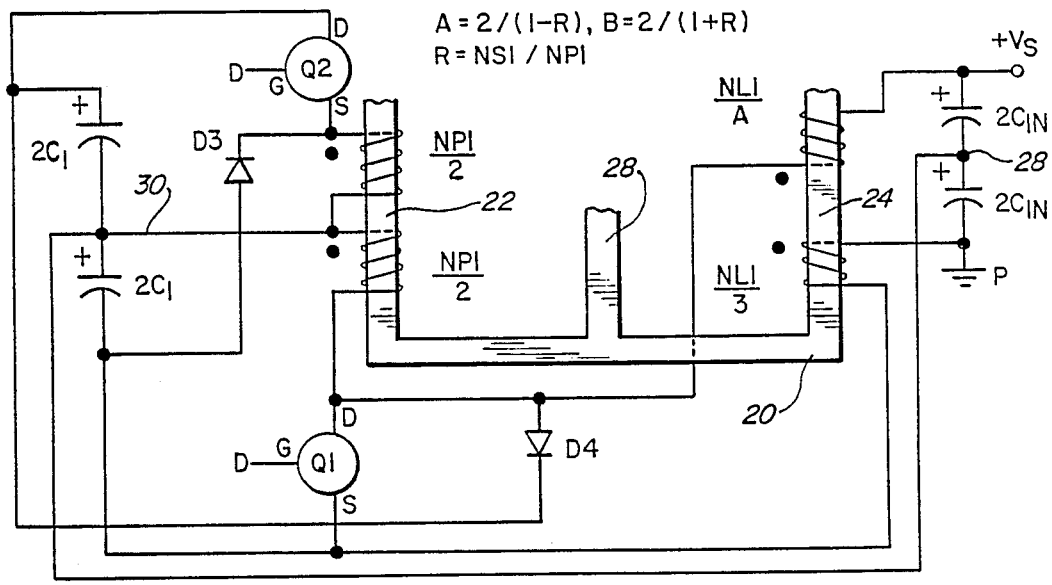
FIG. 3

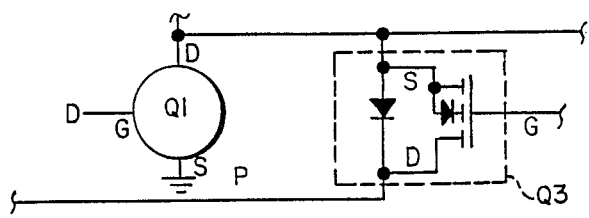
FIG. IA
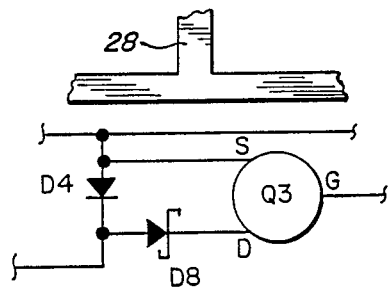
FIG. IE
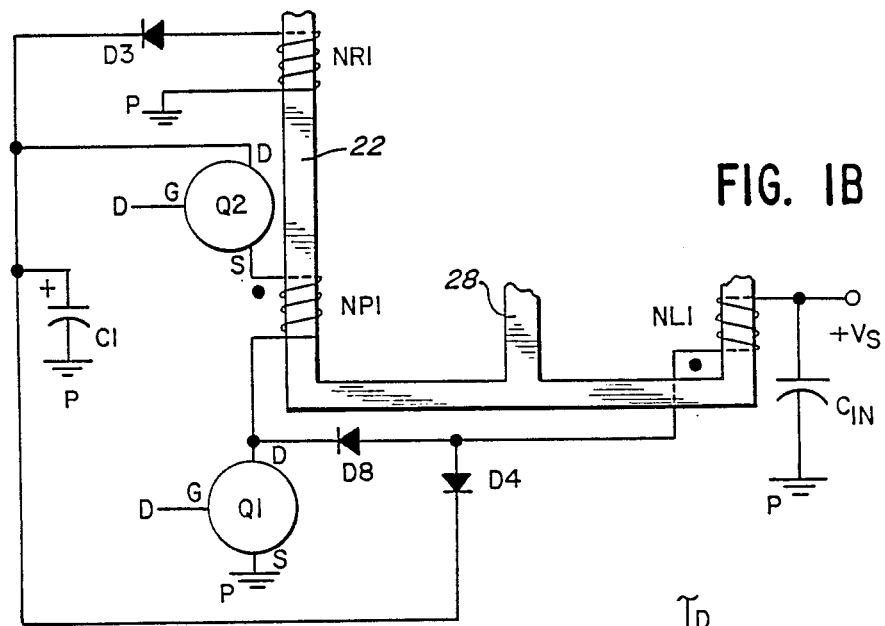
FIG. IB
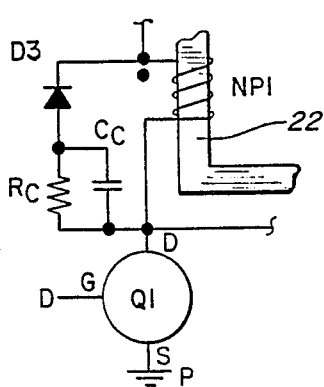
FIG. IC
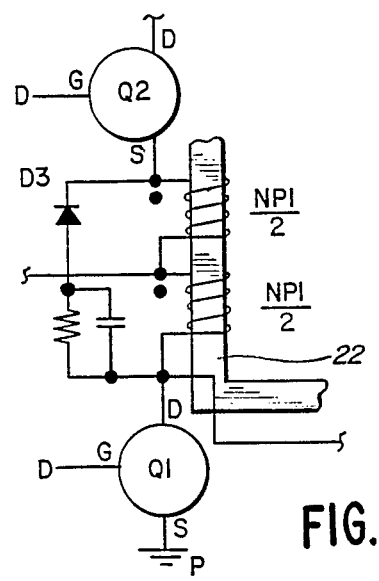
FIG. ID

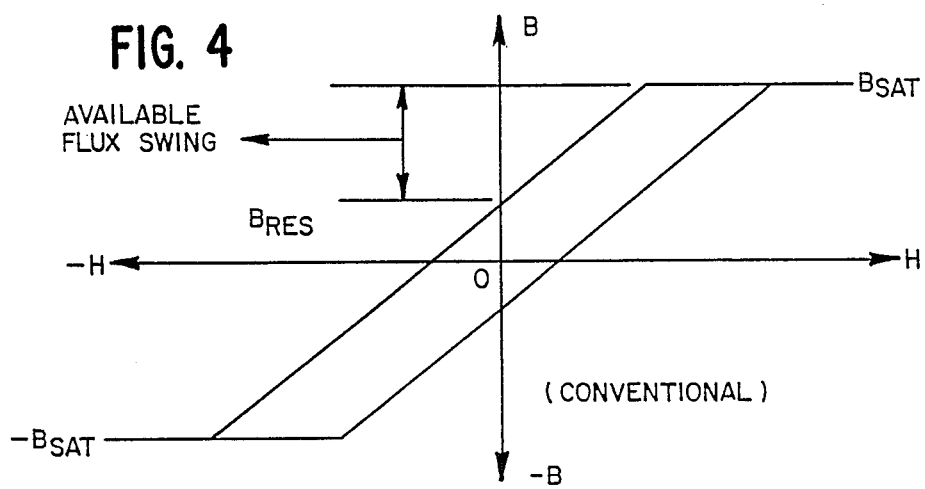
FIG. 4
(CONVENTIONAL)

FIG. 5
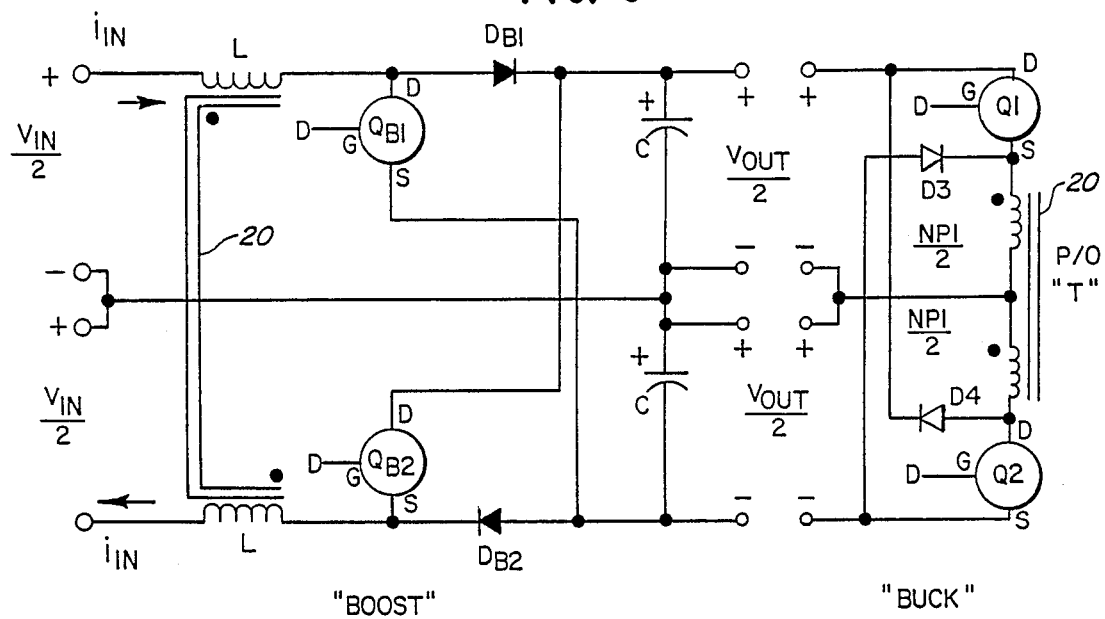
"BOOST"       "BUCK"
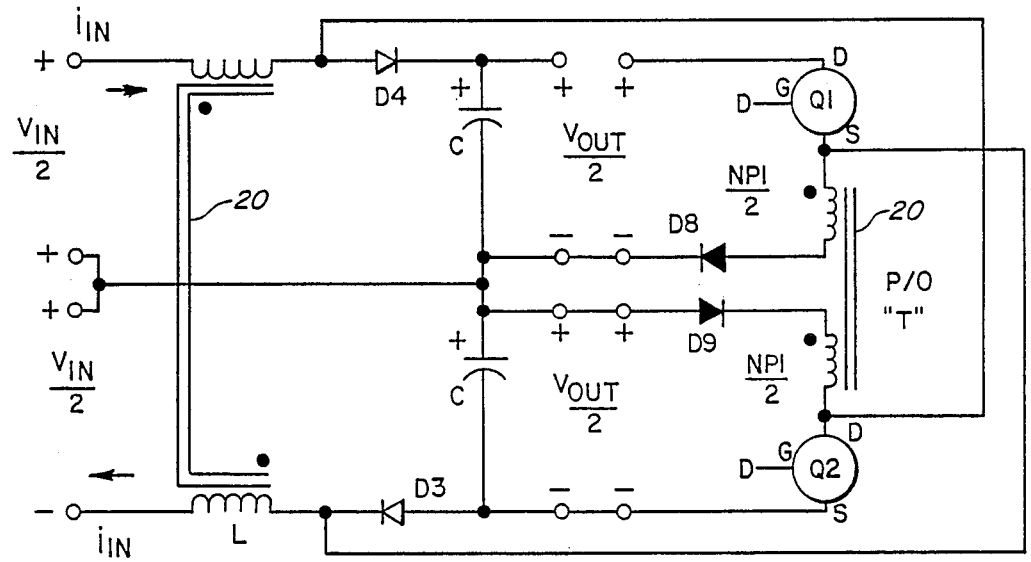
FIG. 5A $A = 2/(1-R), B = 2/(1+R)$
$R = NS1 / NP1$

START-UP CIRCUIT

INTEGRATED-MAGNETICS POWER CONVERTER

TECHNICAL FIELD

This invention relates, in general, to the subject of converters and power supplies and, in particular, to integrated-magnetic converters and switch mode power supplies which produce a plurality of DC output voltages from an AC supply voltage.

This application is related to two patent applications by the same inventor and filed on the same date; those patent applications are entitled, "INTEGRATED-MAGNETIC CONVERTER CORE" (Ser. No. 137,548) and "START-UP CIRCUIT FOR AN INTEGRATED-MAGNETIC POWER CONVERTER" (Ser. No. 137,994).

BACKGROUND OF THE INVENTION

There have been significant advances in the microminiaturization of electronic systems and this has spurred the creation of space-saving switchmode conversion techniques for the design of highly efficient power processing equipment. An excellent overview of the state of the art is presented in the book *Modern DC-to-DC Switchmode Power Converter Circuits*, by Rudolf P. Severns and Gordon E. Bloom, Van Nostrand Reinhold Company, 1985. An exhaustive discussion of the subject is contained in the three volume book *Advances in Switched-Mode Power Conversion*, by R. D. Middlebrook and Slobodan Cuk; TESLAco, Pasadena, Calif. (1983); See Chapters 28 (Vol. 2) and Chapters 2, 15 and 21 (Vol. 3). Chapter 6 of an older textbook by E. C. Snelling entitled, *Soft Ferrites, Properties and Applications*, ILIFFE Books LTD of London (1969), has a discussion of magnetic core properties in the context of high frequency transducers.

A continuing goal of electrical engineers has been the goal of reducing the physical size and parts count of switchmode power converters. The blending together or combining of inductors and transformers into single physical assemblies with little of no compromise in the desired conversion characteristics has been termed "integrated magnetics". One important reason for this effort has been the fact that inductors and transformers are major contributors to the total cost, weight and size of a converter system. Magnetic integration, if properly executed in the design of power converters, can bring added benefits in electrical performance, such as reduced stress on the components or lower ripple currents on input and output power lines. Chapter 12 of the textbook previously cited provides an excellent foundation on the subject of integrated magnetics. Three recent pertinent publications are:

*Core Selection for an Design Aspects of an Integrated-Magnetic Forward Converter*, by Ed Bloom, IEEE Applied Power Electronics Conference, New Orleans, Conference Proceedings, April 1986, pages 141-150;

*New Integrated-Magnetic DC-DC Power Converter Circuits and Systems*, by Ed Bloom, IEEE Applied Power Electronics Conference, San Diego, Conference Proceedings, Mar. 2, 1987, pages 57-66.

*Integrated Magnetics versus Conventional Power Filtering*, by Slobodan Cuk, IEEE Catalog No. 87 CH2477, dated 8/87, 1987 INTELEC Conference.

Some U.S. Patents on the subject of integrated magnetics and converters are:
4,675,797
4,688,160
4,675,796
4,561,046
4,538,219
4,355,352
4,262,328
4,257,087
3,694,726
3,553,620

However, the process of magnetic integration is not simple. For the most part, integrating magnetic elements of a converter does not add to the many design aspects and difficulties with which an engineer must contend during the converter's development phase. However, it does place additional burden on the designer to properly specify the performance of the integrated magnetic elements and a burden on the manufacturer to insure a consistent product which can be more complex than a simple transformer or inductor assembly. For example, there are some subtle electrical problems which arise when coupling inductors together on a common magnetic core. Imbalances in the required turns ratio relationships between the inductor and transformer windings can produce circulating currents in filter networks, resulting in excessive ripple current. High power loss in filter capacitors can result in converter damage and even destruction of the filter elements. Thus, integrated magnetics, as applied to switchmode power converter circuits, is a concept which is not straightforward or easy to apply in practice.

Any advancement that can be made and any teaching in this highly complex subject area will be welcomed by those skilled in the art, and any practical embodiment of these teachings will advance the state of the art. This is particularly true if subtle design considerations are highlighted and circuits are presented which result in unexpected improved performance or operating characteristics, especially when only a few components are added relative to conventional converter designs.

OBJECTS OF THE INVENTION

Accordingly, its a basic object of the invention to disclose several unique integrated magnetic switch mode power converters and circuits.

It is another object of the invention to disclose a converter design where the transformer windings and inductor windings are wound relative to each other such that the DC flux from the inductor windings increases the available flux for transformer action and decreases the number of primary windings needed.

It is still object of the invention to disclose converters featuring two-bobbin cores.

Another object of the invention is to disclose converters which operate in a continuous mode of energy storage under minimum output loading conditions while providing adequate time for removing the magnetization energy of the transformer part of the integrated magnetic structure. At least four new and nonobvious circuits that satisfy these conflicting design requirements are disclosed.

It is yet another object of the invention to disclose a new front-end circuit for a converter.

Many advantages and features of the invention will become readily apparent from the following detailed description of the invention, and the embodiments thereof, and from the claims and from the accompanying drawings.

BRIEF DESCRIPTION OF THE DRAWINGS

FIG. 1 is a schematic diagram of a transformer-isolated forward, or buck, converter topology (proceeded by a boost converter circuit) of one basic embodiment of the present invention; FIGS. 1A through 1E are partial schematic diagrams of further embodiments of the invention;

FIG. 3 is a partial schematic diagram of an improved embodiment of the converter shown in FIG. 1;

FIGS. 4 and 4A are diagrams of the converter core material characteristic of a two-bobbin core of one embodiment of the invention;

FIGS. 5, 5A and 5B are schematic diagrams of the front end of another embodiment of a converter that is the subject of the present application;

DETAILED DESCRIPTION

Figure 2:
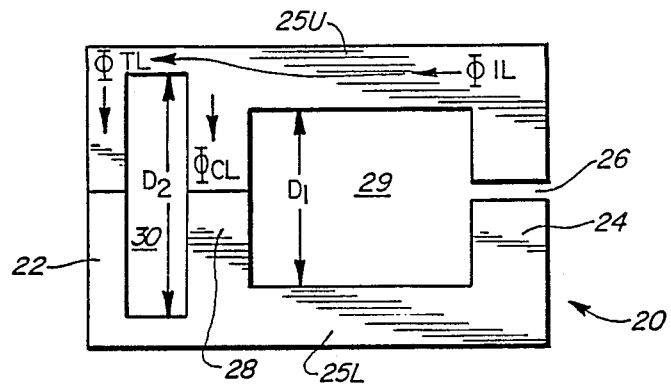
FIGS. 2 and 2A are a plan view and a cross-sectional side view of the core of an integrated magnetic structure for one embodiment of the invention.

While this invention is susceptible to embodiment in many different forms, there is shown in the drawings, and will herein be described in detail, several preferred embodiments of the invention. It should be understood, however, that the present disclosure is to be considered as exemplification of the principles of the invention and that it is not intended to limit the invention to specific embodiments illustrated.

Throughout the discussion which follows, it should be understood that the terms "diode", "switch", "capacitor", "transformer", and "inductor" are used in the functional sense and not exclusively with reference to specific solidstate components, mechanical equivalents, discrete components, or winding arrangements. Similarly, the term "converter" is used in the broadest sense of the word, so as to include inverters, power supplies and devices which convert AC to DC, DC to AC, AC to AC, and DC to DC. Moreover, "winding" includes one winding, turn or equivalent, or a plurality of turns. Before focusing on detailed design considerations and circuit arrangements, one basic design for a power converter will be described in detail.

BASIC CONVERTER

The power converter design, shown in basic form in FIG. 1, is based on a transformer-isolated forward, or buck, converter topology that is preceded by a boost converter circuit. The primary advantage of this tandem arrangement of converter stages is both low and non-pulsing input and output current characteristics. Also, this converter can be designed for lower variations in switch ON times with large variations in input voltage and output loads relative to a comparable single-stage converter. The ideal end-to-end DC voltage gain of this converter is simply $nD/(1-D)$, where "D" represents the duty cycle of conduction of both converter switches Q1 and Q2 over one switching cycle of power conversion, with "n" representing the secondary-to-primary turns ratio of the applicable "transformer" part of the IM (integrated magnetics) assembly (e.g., for the +12V output, $n=(NS1+NS2)/NP1$). Note, winding "dots" are relative to winding NP1 in FIGS. 1 thru 12.

The IM assembly itself consists of a special E-E ferrite core 20 (Also see FIG. 2) designed to accommodate two winding bobbins of different sizes on the two outer legs 22 and 24 of the core. Also, one 24 of the outer legs of the core 20 has been modified to include a small air gap 26 for inductive energy storage. This particular leg 24 of the core 20 is designated as the "inductor" portion of the IM; all induction functions are placed on this leg. The remaining ungapped outer leg 22 of the core structure 20 is designated as the "transformer" section of the IM, where all of the transformer functions are located. The third, or inner, leg 28 of the core 20 is empty of any winding bobbins, and provides a common magnetic flux path for both transformer and inductor operations.

The steady-state operation of the power stage of the converter of FIG. 1, over one switching cycle will now be explained. At the beginning of a switching period, both power switches Q1 and Q2 are turned fully ON, allowing energy stored in a filter capacitor C1 to be transferred to the outputs of the converter (via windings NP1, NS1 and NS2), and to the corresponding inductive windings NL2 and NL3 on the other leg 24 of the core structure 20. During this time, secondary diodes D1 and D2 conduct, while output commutation diodes D5 and D6 are kept in an OFF condition. Thus, energy is stored in the inductive leg 24 of the core (via windings NL2 and NL3). On the −12V output, diode D7 is also kept in an OFF state, permitting filter capacitor C4 to supply load current for this particular output.

Energy buildup in the inductive leg 24 of the core 20 is also being enhanced by current in winding NL1 during this time period (noted as "DTs", where DTs is that part of the switching period when Q1 and Q2 are ON). Current through this particular inductor winding is the dynamic input current to the converter, and is controlled by Q1. Diodes D3 and D4 do not conduct during time DTs.

When Q1 and Q2 are turned OFF by the control system of the converter, both diodes D3 and D4 assume a conduction state, with energy stored earlier in inductive winding NL1 now used to replenish lost energy in capacitor C1 during the switching period DTs. Also, any magnetization energy stored in the transformer leg of the core is now returned to capacitor C1 via D3 and D4.

During the OFF time of Q1 and Q2, IM winding voltage polarities reverse, turning OFF secondary diodes D1 and D2, and allowing diodes D5, D6 and D7 to direct inductive energies associated with NL2, NL3, and NL4 to the three outputs (i.e., +12V, +5V, −12V) of the converter. When Q1 and Q2 are turned ON once again by the control system for another switching cycle, the circuit actions just described are repeated.

Thus, the dynamic current waveforms appearing at the input terminal of the converter (noted as $+V_S$ in FIG. 1), as well as at the +5V and +12V outputs points, are non-pulsating with soft rise-and-fall slopes. Capacitors C2 and C3 provide for further filtering of voltage ripple magnitudes produced by these output ripple currents. Since all pulsating currents produced by the converter ON/OFF operations just discussed are contained within the converter system itself, additional input and output filter elements for further noise reduction are either completely unnecessary, or significantly reduced in number and physical size.

Referring to FIG. 1, it should be noted that the secondary windings and corresponding inductive windings on the IM are not isolated form one another, since there is no requirement for separation of output ground potentials of the three DC outputs from the system. This permits a split-secondary winding arrangement and a separation of inductive windings as noted in FIG. 1, so as to achieve a closer tracking of the +5V and +12V outputs as their loads are changed, or as the converter regulation system adjusts the duty cycle "D" of the input power switches Q1 and Q2. Here, windings NS2 and NL2 see the sum of the +5V and +12V currents, while NS1 and NL3 see only +12V current magnitude current magnitude. This tracking method and winding arrangement is somewhat similar to that used in secondary winding methods for fly-back DC-DC converters where all outputs share a common ground return.

FURTHER DESIGN ENHANCEMENTS

Alternations to the basic IM converter design of FIG. 1 can be made which can provide improved stress conditions on components therein, plus further reduced conducted common-mode noise on its input power line. Referring now to FIG. 3, the internal storage capacitor C1 of FIG. 1 can be separated into two essentially equal series parts, or equivalents, 2C1 and 2C1 (remembering that capacitors in series add as resistors in parallel), and the primary winding NP1 of the IM split into two parts NP1/2 in a like manner and tied to the series connection point 30 of these two capacitors. This variation allows two essentially equal capacitors of lower voltage ratings and increased RMS current capability to be used for C1. Also, the splitting of the primary winding NP1 into two equal parts with a common connection point 30 to the series capacitors assures that Q1 and Q2 will see an OFF voltage stress of nominally ½ that appearing at the "+terminal" of the upper half of the dual-capacitor network.

To reduce common-mode voltage and corresponding noise at the input terminals of the converter stage, the input inductive winding NL1 in FIG. 1 can be split, as diagrammed in FIG. 3. Here, the coefficients of the "split" division A and B are not equal in all designs in order to achieve the best common-mode voltage reduction, also as noted in FIG. 3. For example, suppose that the NS1/NP1 turns ratio is chosen as the reference ratio for determining the division of the NL1 winding, and that its value is 1/60, which would be equal to "R" in the equations shown the upper part of FIG. 3. Therefore, the upper coefficient for division, noted as "A" here, would be made by design to be 120/59, or 2.034, while the lower coefficient "B" would be 120/61, or 1.967. While both A and B values in this example are very close to an "equal" split of 2, even a slight difference can produce improvement in common-mode voltages noise, making the split-winding method, shown in FIG. 3, for NL1 highly desirable.

Finally, since the input capacitor bank $C_{IN}$ of an AC-to-DC converter is normally split into two series parts (each of value $2C_{IN}$) or an equivalent to accommodate voltage-doubling under 120V line operation, the common connection 28 of this bank can also be tied to the split point 30 of the internal capacitor bank. This insures, once again, an equal division of voltages on all power capacitors of the converter at all times.

IM CORE SIZING AND BIAS CONSIDERATIONS

From FIG. 1, it is evident that the two window areas of the IM structure must be large enough to house the windings of each outer leg bobbin. FIG. 2 shows the core 20 of FIG. 1 with its windings removed. Unlike conventional E-E core designs where a single bobbin is used and is mounted only on the inner leg of the core structure, the converter core 20 of this invention is radically different.

Figure 2A:
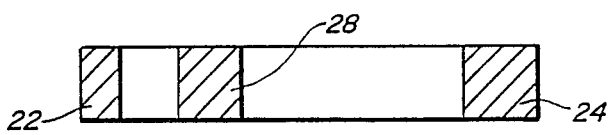

First of all, the window areas on each side of the inner leg 28 are different. A larger window area for inductor windings (leg 24) is shown in contrast to that area required for transformer windings (leg 22). Secondly, the cross-sectional areas of the three short legs 22, 24, and 28 of the core 20 are not equal (See FIG. 2A) with the largest window area 29 is allocated for the leg 24 where the inductive winding bobbin will be mounted. The smallest window area 30 is allocated for the other outer leg 22 where the transformer winding bobbin will be located. The inner leg 28 has a cross-sectional area slightly smaller than the inductor leg 24 (since a large portion of the flux developed by the inductor windings will pass through this particular leg). Finally, from FIGS. 1 and 3, it is evident that at least five windings need to be mounted on the inductor leg 24 of the core 20, while only four windings at most are needed on the transformer leg 22, remembering that both NP1 and NL1 will be split winding arrangements.

As far as flux bias produced by the inductor windings is concerned, FIG. 2 shows what is to be expected. Total bias is the sum of the effect of each of the four inductor windings, with a portion of the total bias seen in each of the other two legs of the core. Bias directions are a direct function of the phase relationships between the inductor windings and the transformer windings. Because the relative value of the reluctance of the gapped inductive leg 24 is much larger than those posed by the other two ungapped core legs 22 and 28, very little flux change produced by transformer winding action will be seen in the inductive leg of the core. However, a significant amount of flux produced by the inductor windings will be seen in the inner 28 and transformer leg 22 of the core 20. This unique situation permits the design of the transformer portion of the IM to be accomplished almost independently from the inductor portion.

The magnitude of the flux bias in each leg is dependent on cross-section areas of the three legs of the core 20, since the reluctance value for each leg is inversely proportional to its area and directly proportional to permeability of the core material. Thus, the area of each leg must be made large enough to sustain its inductive bias plus any additive AC flux magnitudes produced by all other windings.

Because of the high degree of isolation between transformer and inductor legs made possible by the presence of the air gap 26 in the inductive outer leg 24, the bias developed by the inductive leg can be used in a very unusual and effective manner.

Figure 4A:
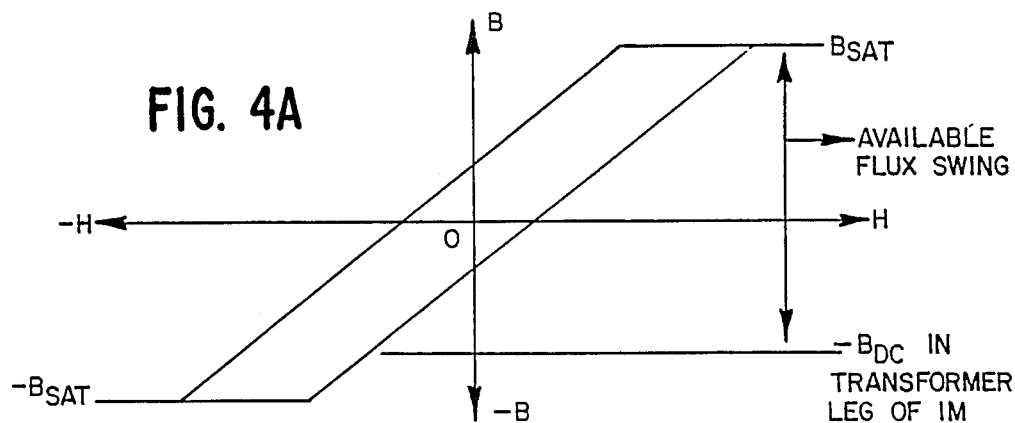

As shown in FIG. 4, in a conventional transformer core used for a transformer-isolated forward, or buck, converter, available flux swing for selecting transformer turns is simply the difference between residual flux $B_{res}$ in the core and the maximum saturation flux level $B_{sat}$ of the core material. However, the bias produced by the inductive leg 24 in the transformer leg 22 of IM core of FIG. 2, allows a much larger swing in flux, as diagrammed in FIG. 4A, since the flux inductive bias will oppose that produced by transformer action. Therefore, transformer turns needed can be reduced significantly. This, in turn, implies a smaller window area needed for the transformer windings of the IM core structure, plus a corresponding savings in copper power losses for these particular windings.

Assuming that negligible AC flux produced by transformer action is seen in the air-gapped, or inductive leg, of the core, then:

$$V_{C1} = N_{P1} \, d\phi/dt$$
$$= N_{P1} (\text{delta } \phi_{TL} - (-\Phi_{TL}))/DT_s$$

The average value across the filter capacitor C1 is approximately $V_s/(1-D)$.
Solving for delta $\phi_{TL}$:

$$\text{delta } \phi_{TL} = [V_s DT_s/(1-D)](1/N_{P1}) - \Phi_{TL}$$

If the upper boundary on delta $\phi_{TL}$ is the saturation flux limit for the core material, $\phi_s$, then:

$$N_{P1} \geq \frac{V_{01}(\text{max}) \, T_s(\text{max})}{n_1 \, h(\text{min}) \, [\phi_s(\text{min}) + \Phi_{TL}(\text{min})]}$$

$$N_{s2} \geq \frac{V_{01}(\text{max}) \, T_s(\text{max})}{h(\text{min}) \, [\phi_s(\text{min}) + \Phi_{TL}(\text{min})]}$$

where "h" is the efficiency of power transfer. These two equations clearly show the advantage of the DC flux bias component in the transformer leg caused by the inductive windings on the outer leg of the core. They also show that the minimum loading on the converter outputs, which sets the value of $\Phi_{TL}(\text{min})$, is important in setting the boundary condition for both the primary and secondary turns. Thus, the higher the minimum loads are, the lower the number of primary and secondary turns, the smaller window area to house the transformer windings, and the smaller the core volume will be overall.

Those skilled in the art will understand that the minimum loading specification of the converter output is also a determining factor of the reluctance values of the inductor windings, such that the converter is always operating in a mode of continuous energy storage.

IM DYNAMICS

It can be shown (See "Discontinuous Inductor Current Mode in the Optimum Topology Converter", Paper No. 21, pp 369-372, TESLAco Power Electronics Series, Vol 2.) that, for a boost-buck converter system, continuous energy storage in the reactive components will occur if the minimum duty cycle of switch conduction is kept greater than or equal to 0.5 or 50%. This requirement conflicts with the need to provide adequate time for removing the magnetization energy of the transformer part of the converters of FIGS. 1 and 3. Since the primary turns NP1 or NP1/2 are used for both power delivery and reset functions, the duty cycle of the switches Q1 and Q2 must be limited to less than or equal to 0.5 or 50%. To satisfy these two conflicting operating conditions, the implication is that the duty cycle of the switches Q1 and Q2 (See FIG. 1) must be always equal to 50% regardless of the input voltage or the output load changes. Since the regulation control system is designed to adjust the duty cycle with such changes to maintain constant output voltages, the converter designs of FIGS. 1 and 3 can be made to operate, in a practical embodiment, if any of the following changes are made:

(1) Change diode D4 in FIG. 1 to a bi-directional switch element Q3 (See FIG. 1A) to allow the boost portion of the converter to operate always in a continuous mode of energy storage regardless of the reflected load from the buck portion. This will allow passage of current through winding $N_{L1}$ in both directions, thus allowing capacitor C1 to discharge unused energy back to the input source $V_S$ under light load conditions on the converter's outputs. FIG. 1E shows another circuit comparable to that of FIG. 1A, using switch Q3 and diode D8 to provide a bi-directional path around diode D4.

(2) Add a separate reset winding NR1 (See FIG. 1B) for the transformer leg 22, with appropriate turns to allow a shorter reset time, thus increasing the maximum duty cycle allowed for Q1 and Q2 beyond 50%.

(3) Change the power transfer characteristic of the boost portion of the converter such that the boundary of minimum duty cycle of 50% is changed to a lower value, say 25%. This would permit a usable range of duty cycle of control for output voltage regulation against line and load changes.

Change (1)

To accomplish this change requires the use of a power MOSFET device (See FIG. 1A) in place of diode D4, with gate drive applied at times when the two main converter switches Q1 and Q2 are in an OFF state. This change also requires the addition of another drive winding on the control circuit isolation transformer, a minimum of two gate drive resistors and some snubbing network to reduce the turn-on/turn-off energy transients. It can be shown that all three switches Q1, Q2 and Q3 would need to have a drain-to-source break down rating of greater than 534 volts, ideally (for D=25% and a 400V line voltage).

Change (2)

To accomplish this change, means another winding must be mounted on the transformer bobbin, increasing the adjacent window area and size of the IM. The number of turns of this winding would have to be lower than those on the primary winding in order that the switch duty cycle maximum could be extended beyond 50%. Diode D3 (See FIG. 1B) is used to commutate the reset energy to capacitor C1 for this winding. Another diode D8 is needed to isolate C1 from switch Q1. The "off" voltage stress on Q1 and Q2 will increase due to the reduction in reset time. For a duty cycle value of 67%, it can be shown that the voltage across the capacitor C1 would be about 600 volts and the reflected voltage into the primary from the reset action during the same time will be approximately 1,200 volts. Thus, the OFF-voltage stress seen by the two switches Q1 and Q2 in FIG. 1B would be on the order of 900 volts. For this reason, the reset method of FIG. 1B, while feasible, may not be acceptable since the voltage stress levels for Q1 and Q2 may approach to that of present state-of-the-art devices, namely 1,000 volts.

An alternate method for implementing change (2) would be to use a dissipative averaging reset approach, where reset voltage is maintained and adjusted to a proper level as a function of the voltage on capacitor C1. This method is illustrated in FIGS. 1C and 1D, for the converters of FIGS. 1 and 3, respectively (Also, see "International Rectifier HEXFET Data Book", 1982-1983 Edition, pp A-87 through A-98). It can be shown that the stress levels in switches Q1 and Q2 would be about 100 volts less than that of change (1) and that a 1,000 volt device would be acceptable for switches Q1 and Q2, which devices are readily available. However, it must be remembered that this solution is a dissipative one, one in which power is wasted in resetting the core.

Change (3)

Change (3), if it can be accomplished without a significant addition of more parts to the converter and/or increases in stress on converter components, is the most desirable. However, how this change in power transfer characteristic can be implemented without altering the desired boost-buck nature of the converter systems of FIGS. 1 and 3 is not at all obvious.

It should be apparent that any acceptable solution must alter the boost portion of the converter such that minimum duty cycle to maintain continuous mode can be moved below 50%, and to a point where duty cycle can be practically varied to regulate outputs with changes in input and output voltage loads. Also, such alterations must not cause excessive stress on switches or diodes and, ideally, should be accomplished with the least number of new components.

Consider the boost part of the converter arrangement of FIG. 5, which follows the teachings of this invention. Looking at the left-hand portion of the figure, the basic boost topology has been altered to add one-half of its output voltage in series with each switch QB1 and QB2, rather than connection of the switch to the return terminal of the input source, as is done in a conventional boost converter topology. Also, it is assumed that the value of this added source voltage is of the polarity shown.

Assuming, that the boost part of the converter in FIG. 5 is operating in a continuous mode of energy storage, the ideal input-to-output voltage transfer function of the revised boost section can be evaluated by establishing the volt-second balance relationship across the inductor L over one switching period of performance. By comparing the requirement for the continuous mode operation defined for the boost design of FIG. 5 against that needed for the boost section of FIGS. 1 and 3, it can be shown that, for minimum duty cycles greater than $\frac{1}{3}$ or 33%, the design of FIG. 5 has a lower boundary limit for a given minimum load, switching frequency and inductor values. This new design also has a lower limit on maximum switch duty cycle over that of the conventional approach, namely 50%, ideally, rather than 100% for the basic circuit. This fact alone suggests that the new design shown in FIG. 5, if used in place of the basic boost part of the IM converter arrangement of FIG. 1, will allow operation of both the boost and buck portions in a continuous energy storage mode below the 50% limit previously established.

Consider now the interface required between the design of FIG. 5 and that proposed earlier in FIG. 3 for the "split" input inductor enhancement to the "forward" or buck portion of the IM converter. Since all four switch sets illustrated in FIG. 5 operate at the same duty cycle, it is possible to eliminate the switch sets associated with the boost stage QB1 and QB2 by allowing Q1, Q2, D3 and D4 to perform their functions. The unique design that results from this elimination is illustrated in FIG. 5A. Note that two isolation diodes D8 and D9, each in series with one-half of the primary winding NP1, are now required to keep this split winding isolated from the input source. Also, the primary winding must now be split into two separate but equal windings, rather than a split, or tapped, arrangement illustrated in FIGS. 3 and 5.

If a comparison is made now of the basic converter design of FIGS. 1 and 3 to that of FIG. 5A, it is found that two isolation diodes (D8 and D9) have been added over that of the original converter. Also, the split primary winding of the IM must now be changed to two separate but equal windings, and the location of diode D3 must be changed. FIG. 6 shows the design of FIG. 5A in a format identical to that of FIG. 3 for comparison purposes.

Figure 5B:
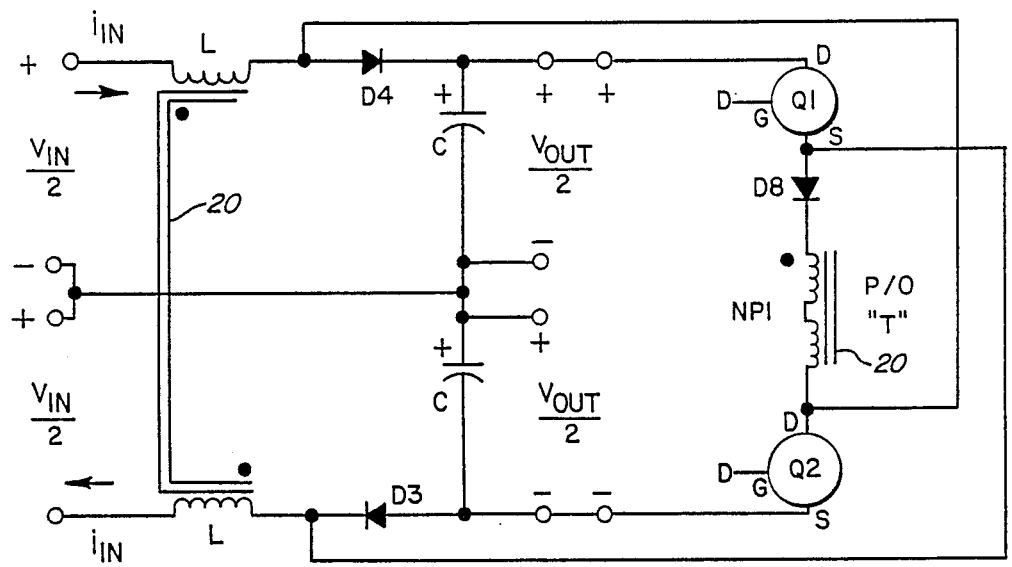
Figure 8:
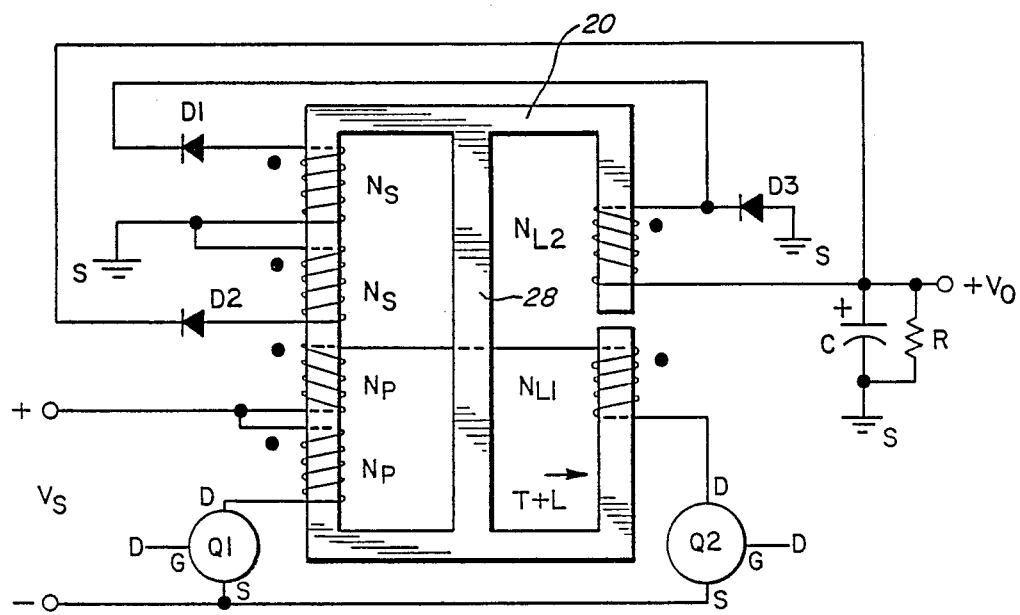
FIGS. 8 through 12 are schematic diagrams of additional embodiments of the invention.
Figure 6:
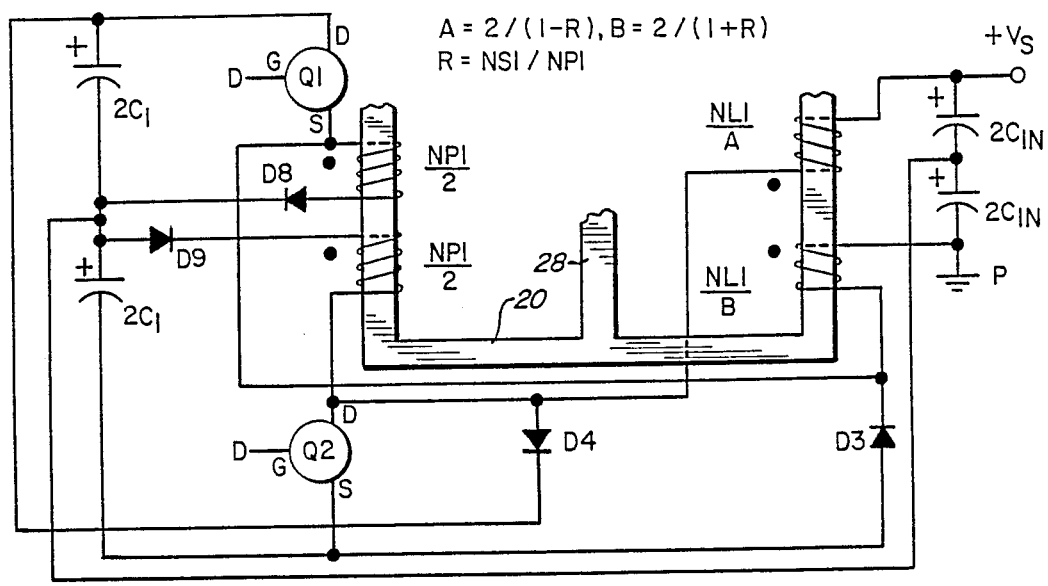
FIGS. 6 and 6A are partial schematic diagrams of still other embodiments of a converter that is the subject of the present application.
Figure 6A:
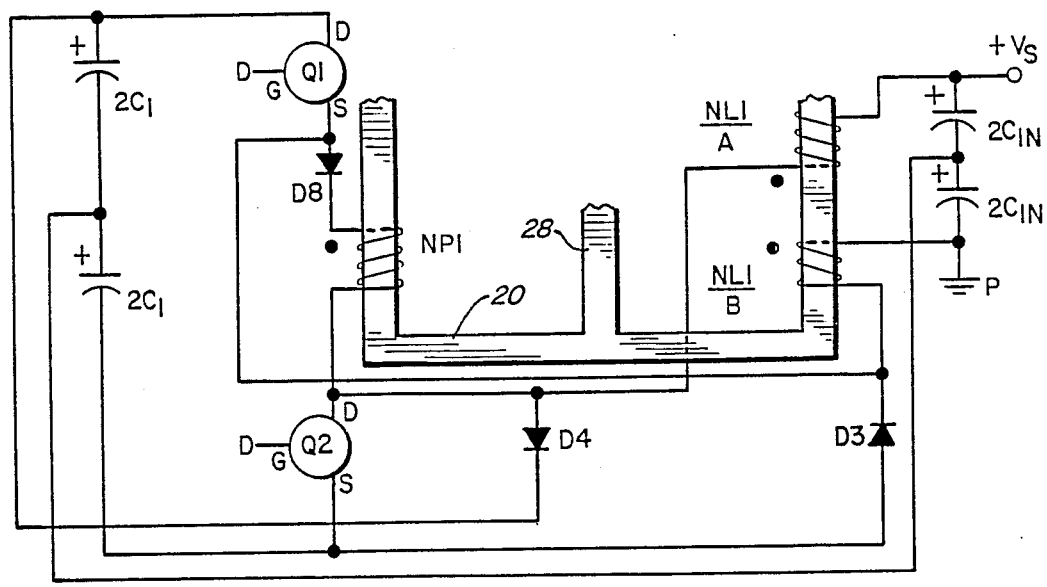

Even simpler versions of FIGS. 5A and 6 can be realized by eliminating the split primary windings, and by using only one isolation diode in series with the total primary winding. The new circuits are shown in FIGS. 5B and 6A, respectfully, where diode D8 is the needed isolation diode for the single primary winding. Therefore, in these versions, only one more diode is added to the basic design over that in FIGS. 1 and 3.

It can be shown that a usable range of duty cycle control between 25 and 50 percent exists for the IM converter of FIGS. 5A, 5B, 6 and 6A. It also can be shown that in the circuit version shown in FIGS. 5B and 6A, the voltage stress levels for D3 and D4 are the same, while the single isolation diode D8 will see the total output voltage of the boost section, or 800 volts. Thus, the rating of D8 in this regard would be twice that needed for the isolation diodes D3 and D4 of FIGS. 5A and 6.

COMPARISONS - ALL CHANGES

Based on the foregoing discussion, a summary table can be formulated of the pros and cons of each candidate circuit change. This table is shown below:

TABLE I

| ITEM | CHG #1 | CHG #2 | CHG #2A | CHG #3 |
|---|---|---|---|---|
| #MosFet Switches | 3 | 2 | 2 | 2 |
| #Diodes (primary) | 3 | 3 | 3 | 3 min |
| $V_{D-S}$ (max) ideal | 534 V | 909 V | 800 V | 800 V |
| $V_R$ (primary diodes) | 534 V | 606 V | 800 V | 800 V |
| D range | ≦0.5 | ≦0.5 | ≦0.5 | 0.25 to 0.5 |
| $L_1$ value** | $L_2/n_1^2$ | $L_2/n_1^2$ | $L_2/n_1^2$ | $L_2/n_1^2$ |
| $n_1$ value | 1/20* | 1/60* | 1/60* | 1/30* |

*Assumes minimum duty cycle of 25% at high line, and 75% transformer efficiency.
**Where $n_1$ is $N_{S2}/N_{P1}$, $L_1$ is the primary inductance and $L_2$ is the output inductance.

From Table I, it is evident that either alternatives for circuit change (2) will result in more primary turns for the transformer section of the IM than those noted for change (1) or change (3). However, for change (3) the relative inductance of the primary inductive winding $L_1$ will need to be four times larger than the other three circuit alternatives, implying the need for more turns in this area for the IM.

Thus from Table I, change (1) offers the lowest OFF voltage stress to all primary switches and diodes, allowing a less-expensive MOSFET devices to be used over those needed for changes (2) or (3). However, as noted earlier, change (1) will require additional parts for driving the extra MOSFET device plus those needed for voltage snubbing. In addition, because of the relative slow recovery times expected from the internal body-to-drain diode of Q3 in FIG. 1A, an external commutation diode will be needed to perform this function. Also, to prevent conduction of the MOSFET diode, another low-voltage diode (Schottky) must be added in series with Q3. Thus, a practical implication of this solution will add two more diodes to the circuit of FIG. 1A, as illustrated in FIG. 1E.

Circuit change (3), while adding one more diode to the basic design concept of the converter and having voltage stress levels comparable to alternate change (2), but 266 volts greater than change (1), is attractive in that no additional MOSFET devices are required. For these reasons, change (3) is considered optimum. Devices to be considered for these MOSFETS are the Philips (Siemens) BU 50A and the MOTOROLA MTP3N100 or MTH5N100. These parts have a breakdown rating of 1000V and drain current maximums well within those needed for a 100W converter application.

DETAILED EMBODIMENT

Figure 7:
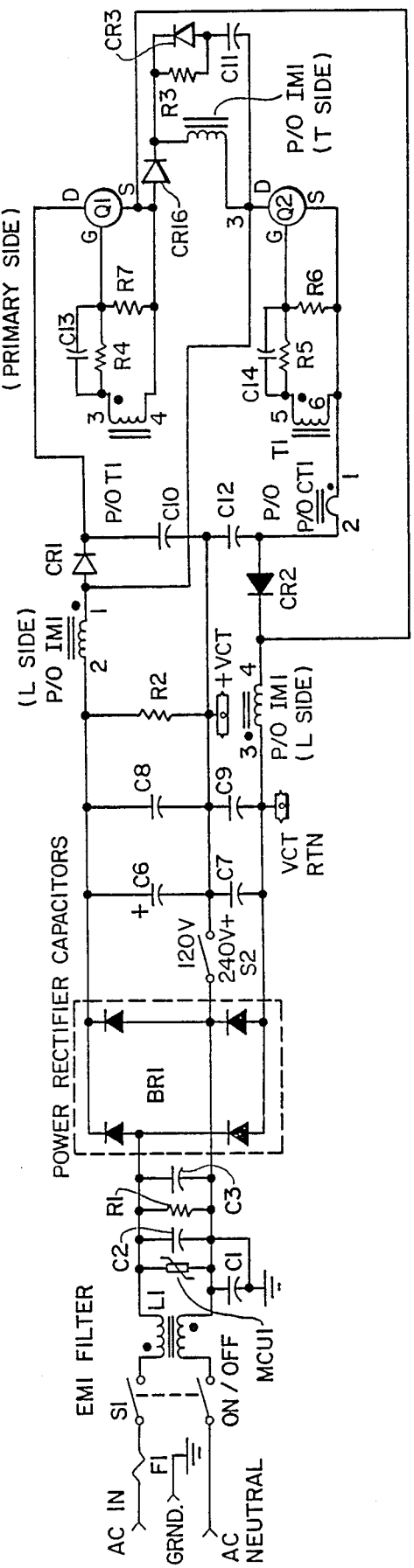
FIGS. 7, 7A, and 7B are detailed schematic diagrams of one practical embodiment of a converter system which incorporates the principles of the invention.
Figure 7A:
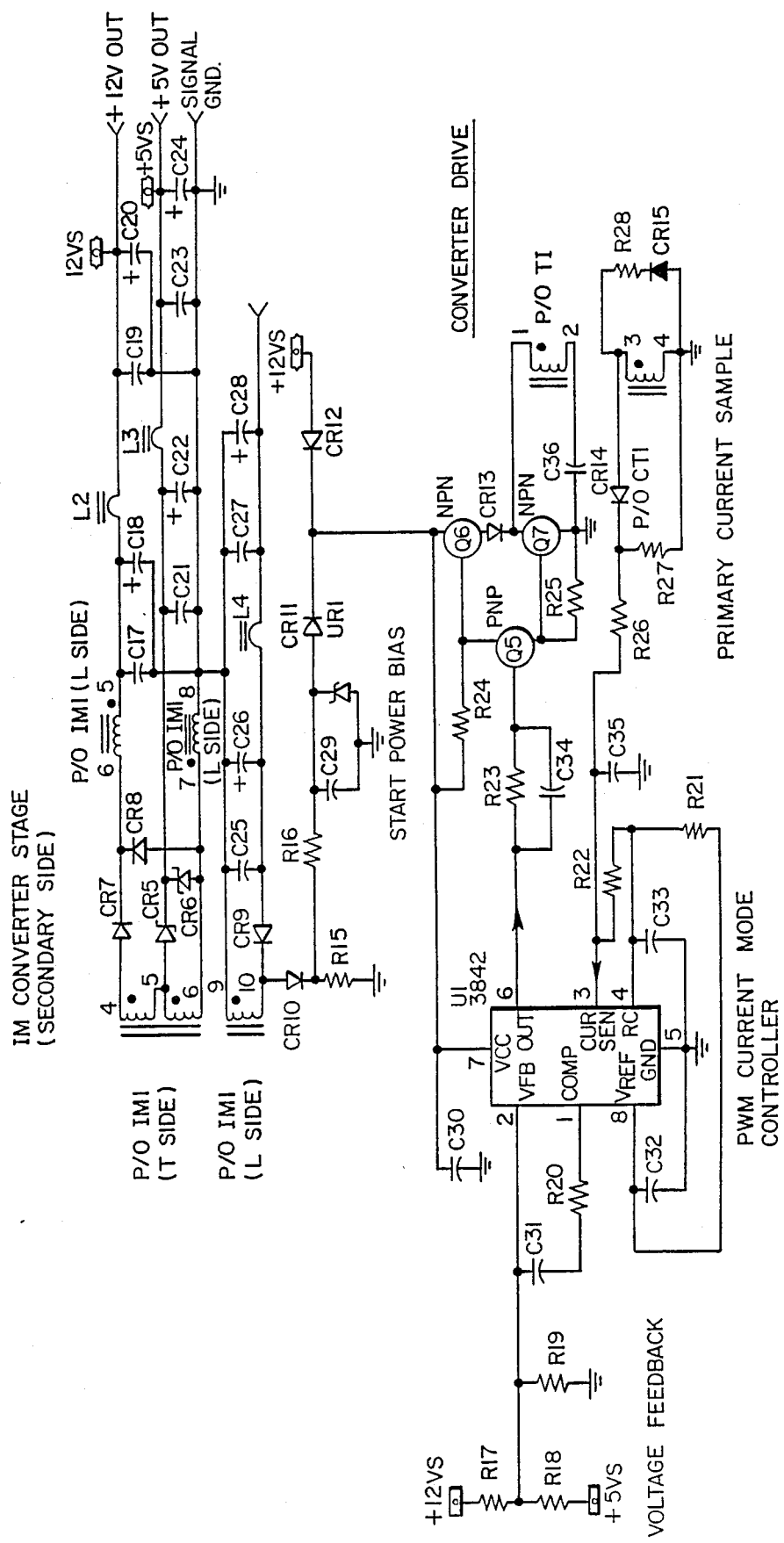
Figure 7B:
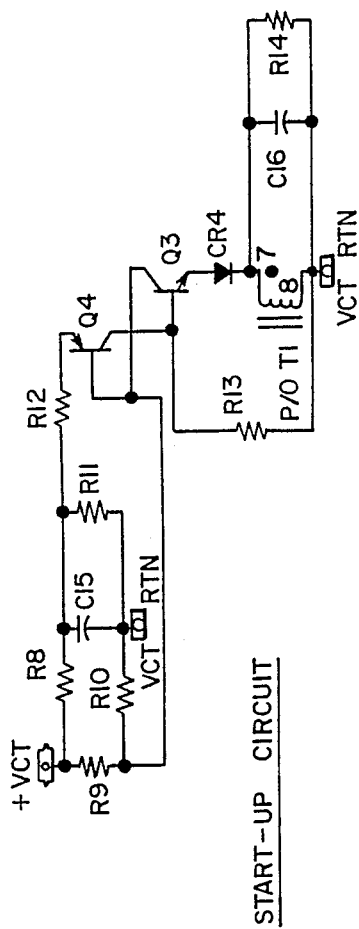

FIG. 7 is a circuit schematic of the IM power converter system of FIG. 3 embedded within a complete power supply, including AC-to-DC networks to develop the high DC input voltage for it, a starting network, and current-mode regulation control circuits. Important circuit areas and functions are noted by the captions on FIGS. 7, 7A, and 7B. This converter is designed to deliver 100 watts of power to three different DC outputs of +5V, +12V, and −12V. Incoming AC potential can range between 90 VDC and 270 VDC. The core of the integrated magnetics (IM1), for a 100KHz operating frequency, can be made of ferrite material.

The AC-to-DC rectifier network, plus the EMI FILTER circuit preceding it, is of a conventional design, with a simple manual switch S2 indicated for accommodating either a 120V, 60Hz or a 240V, 50Hz AC input voltage.

The START-UP CIRCUIT is quite novel, in that starting power is developed directly through the main IM converter stage, rather than using a separate bias converter. At AC power application, a DC voltage VDC is applied to the start circuit, which charges capacitor C15 to a potential where Q3 and Q4 turn ON. With Q3 and Q4 ON, the energy built up in C15 is then dumped into winding 7-8 of the gate drive transformer T1, which controls the main IM converter power switches Q1 and Q2. This short pulse of energy then turns ON switches Q1 and Q2 which, in turn, produce a voltage at winding 9-10 of the IM of a polarity to allow capacitor C29 to be charged rapidly to the voltage level of zener diode VR1. The energy stored in the capacitor C29 by this action allows the regulation integrated circuit U1 to be activated, as well as the output CONVERTER DRIVE network (composed of Q5 through Q7). The pulse-width-modulation (PWM) network within U1 then takes control of the converter DRIVE NETWORK, turning ON and OFF Q1 and Q2, via T1, until output voltages build up to their desired values. Once the CONVERTER DRIVE network is controlled by the PWM actions of U1, the START-UP CIRCUIT is disabled. The disable method is via T1, such that each time Q7 in the CONVERTER DRIVE network is turned ON, winding 7-8 receives a pulse of voltage polarity to once again turn on Q3 and Q4, preventing build-up of sufficient energy in C15 to turn ON Q4 in the manner discussed earlier upon the initial application of AC power to the system.

The CONVERTER DRIVE network is designed so as not to load the start-up winding 7-8 on T1 during an actual start-up sequence. This blocking action is performed by diode CR13 and the base-to-collector diode of Q7 in the CONVERTER DRIVE network. Once the +12V output has reached its desired value, it is used to power U1 and the converter drive system via CR12. Energy is no longer drawn from C29 since diode CR11 will become reverse-biased.

To maintain voltage regulation of outputs during steady-state operation, both the +12V and −5V lines are used to provide a sample of output potentials for PWM control purposes. This is performed by the VOLTAGE FEEDBACK network of resistors R17, R18, and R19. Frequency compensation for stability of voltage regulation control are the functions of C31 and R20. The 100 KHz switching frequency of PWM operation of U1 is set by resistor R21 and capacitor C33. The primary CURRENT SAMPLE of dynamic switch currents in the IM converter is taken via current transformer CT1, and transformed to a voltage value via CR14 and resistor R27 tied to the secondary of CT1. This sample is then passed through a high-frequency RC filter (R26 and C35) to remove undesirable switching noise, and is then used internally by U1 with the output voltage samples to determine the duty cycle of condition of the power switches within the IM converter to maintain constant output potentials with changes in loads and input AC line potential.

Table II summarizes the expected performance of the converter shown in FIG. 7.

TABLE II

| PARAMETER | MINIMUM | MAXIMUM |
| --- | --- | --- |
| Input Voltage | 200 Volts | 400 Volts |
| Output Voltage #1 | 4.83 Volts | 5.22 Volts |
| Output Loading #1 | 2 amps | 14 amps |
| Ripple Voltage #1 | — | 40 millivolts |
| Output Voltage #2 | 11.56 volts | 12.56 volts |
| Output Loading #2 | 0 amps | 2.1 amps |
| Ripple Voltage #2 | — | 50 millivolts |
| Output Voltage #3 | −10.97 volts | −13.15 volts |
| Output Loading #3 | 0 amps | −0.41 amps |
| Output Ripple #3 | — | 50 millivolts |

OTHER EMBODIMENTS

Figure 9:
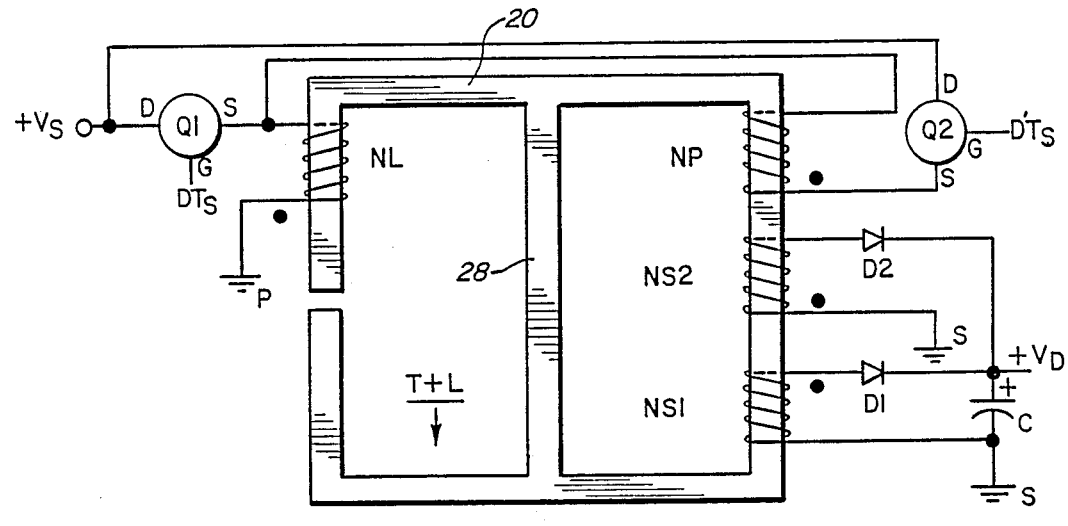
Figure 10:
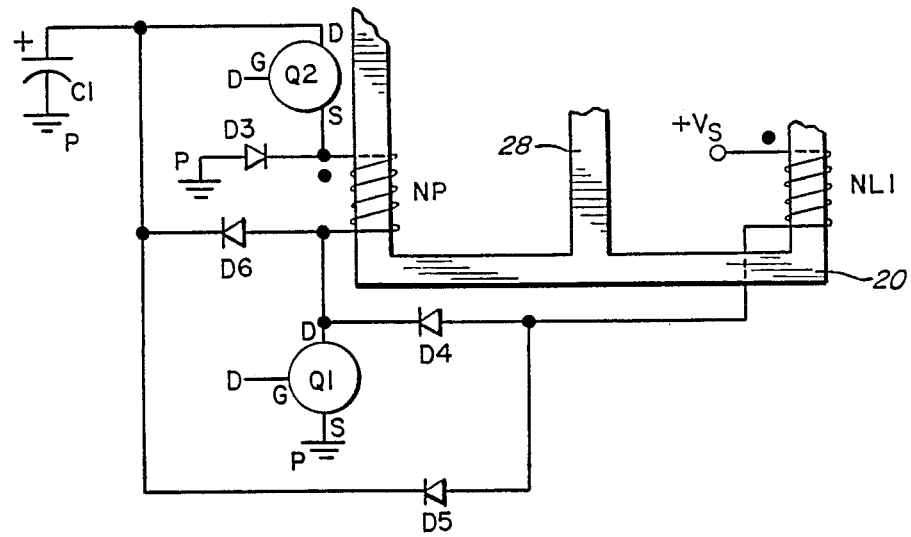
Figure 11:
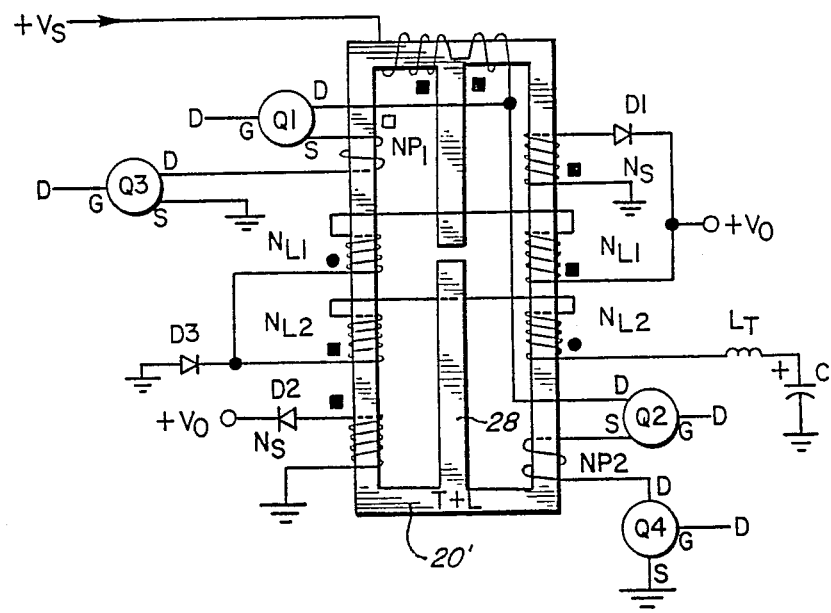
Figure 12:
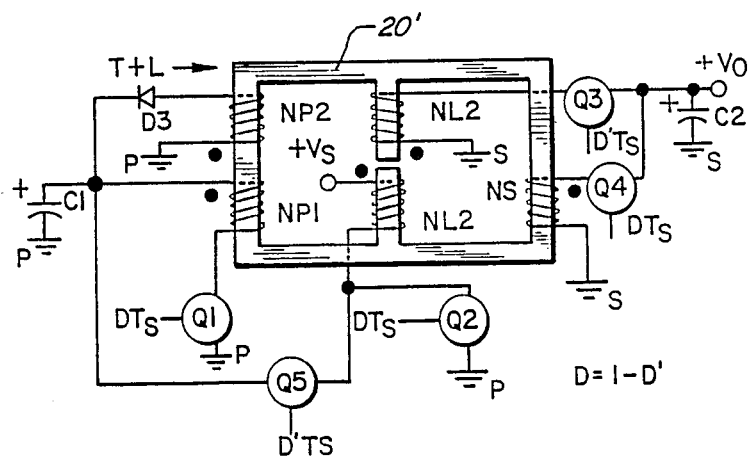

From the foregoing, it will be observed that numerous variations and modifications may be effected without departing from the true spirit and scope of the novel concept of the invention. For example, FIG. 8 discloses an IM push-pull buck converter having a center-tapped primary winding, a center-tapped secondary winding, and two inductors, one connected to the primary side of the converter and one connected to the secondary side of the converter. FIG. 9, by contrast, illustrates a boost converter having a single primary winding, two secondary windings, and one inductor winding, with the duty cycle of the switch-controlled primary winding NP and the switch-controlled inductor winding NL being complementary. FIG. 10 illustrates an integrated-magnetic boost-forward converter comparable to the design of FIG. 1, with an added diode D6 for resetting the IM core. All of these embodiments (FIGS. 8, 9, and 10) are two-bobbin designs with a core having one outer leg on which the transformer windings are carried, a center leg, and a gapped outer leg which carries only the inductor windings. These basic principles can be expended to an integrated-magnetic two-bobbin core where the ungapped outer legs carry either primary, secondary, or inductor windings, and wherein the empty center leg is gapped. This concept is illustrated in FIG. 11. Also shown in FIG. 11, are added windings NL2 to each outer leg for control of ripple current appearing at the output of the converter. This control is achieved by proper values of the inductor LT and the capacitor C in FIG. 11, and the turns ratio between windings, NL1 and NL2. Finally, FIG. 12 illustrates an integrated-magnetic boost-forward converter with a bi-directional power flow capability. It should be noted that five solid-state bi-directional switches are used (in FIG. 12) with the duty cycles (D and D') of conduction of all the switches being complementary. Thus, it should be understood that no limitation with respect to the specific structure and circuit arrangements illustrated is intended or should be inferred. It is, of course, intended to cover by the appended claims all such modifications as fall within the scope of the claims.

I claim:

1. A power converter with integrated magnetics, comprising:

a magnetic core having at least two winding windows, windings of transformer means passing through one winding window, and windings of inductor means passing through one other winding window, said windings being wound relative to each other about said core, such that the flux of said inductor means opposes the direction of flux developed by said transformer means and increases the available flux for transformer action; a first circuit of a first diode in series with a first switch; a second circuit of a second diode in series with a second switch; and capacitor means in parallel with said first circuit and connected at least to one end of said second circuit, said transformer means including primary winding means with one end of said primary winding means being joined to the junction between said first diode and said first switch and the other end of said primary winding means being joined to the junction between said second diode and said second switch.

2. The converter of claim 1, wherein said winding windows have unequal area and said one winding window has an area less than that of said one other winding window.

3. The converter of claim 2, wherein said core is generally rectangular and said winding windows are rectangular; wherein said core comprises an inner leg which defines at least part of the adjacent sides of said winding windows; and wherein said adjacent side of said smaller winding window is longer than said adjacent side of said larger winding window.

4. The converter of claim 1, wherein said core comprises three short legs; wherein one of said short legs has a cross-sectional area greater than a second short leg and less than the third short leg; and wherein said second short leg is adapted to receive a bobbin carrying said windings of said transformer means, and said third short leg is adapted to receive a bobbin carrying said windings of said inductor means.

5. The converter of claim 1, wherein said inductor means includes inductor winding means which has one end connected to the junction between said first diode and said first switch, and has its other end adapted to be connected to a source of voltage.

6. The converter of claim 1, wherein said primary winding means comprises two windings having a common center tap; and wherein said capacitor means comprises two capacitors in series with each other, the junction between said two capacitors being connected to said center tap; and wherein said second circuit is connected in parallel with said two capacitors in series.

7. A power converter with integrated magnetics, comprising:

a magnetic core having only two winding windows of unequal area and three legs of unequal cross sectional area with the leg having the largest cross sectional area defining an air gap, windings of power transformer means passing around the leg with the smallest cross sectional area and through only the one winding window with the smaller area to form a transformer core leg, and windings of inductor winding means passing around said leg with the largest cross sectional area and through only the other winding window, said windings of said inductor winding means being wound relative to said windings of said power transformer about said core, such that the flux of said inductor winding means opposes the direction of flux developed by said power transformer means in said transformer core leg and increases the available flux for transformer action.

8. An integrated magnetics power converter, comprising: a magnetic core having at least two winding windows; primary winding means and secondary winding means of a transformer passing through one winding window; inductor winding means passing through another window, said winding means being disposed relative to each other such that the flux of said inductor winding means opposes the direction of flux developed by said primary winding means; a first circuit having a first diode in series with a first switch; a second circuit having a second diode in series with a second switch; two capacitors in series with each other and in parallel with said first circuit and said second circuit, one opposite end of said primary winding means being joined to the junction between said first diode and said first switch and the other opposite end being joined to the junction between said second diode and said second switch; and two diodes connected in series, said primary winding means comprising two winding parts with the adjacent ends of each winding part connected to one of the free ends of said two diodes and with the junction between said two diodes connected to the common junction between said two capacitors.

9. An integrated magnetics power converter, comprising: a magnetic core having at least two winding windows; primary winding means and secondary winding means of a power transformer passing through one winding window; inductor winding means passing through another winding window, said winding means being wound relative to each other such that the flux of said inductor winding means opposes the direction of flux developed by said primary winding means; a first circuit of a first diode in series with a first switch; a second circuit of a second diode in series with a second switch, one end of said primary winding means being joined to the junction between said first diode and said first switch and the other end of said primary winding means being joined to the junction between said second diode and said second switch, said inductor means comprising two inductors, one inductor having one end being adapted to be connected to a source of voltage and having its other end connected to the junction between said second diode and said second switch; and capacitor means connected in parallel with said first circuit to define a parallel circuit, said parallel circuit being connected in series with the other of said two inductors to define a series-parallel circuit, said series-parallel circuit being in parallel with said second circuit.

10. The converter of claim 9, further including an isolation diode in series with one end of said primary winding means, the other end of said primary winding means being connected to the junction between one of said first switch and second switch and its diode, the other end of said isolation diode being connected to the other of said first switch and second switch and its diode.

11. An integrated magnetics power converter, comprising: a magnetic core having at least two winding windows; a center tapped primary winding and a secondary winding of a power transformer passing through one winding window; inductor winding means passing through another window; a first circuit of a first diode in series with a first switch; a second circuit of a second diode in series with a second switch; one end of said primary winding being joined to the junction between said first diode and said first switch and the other end of said primary winding being joined to the junction between said second diode and said second switch; and the equivalent of two capacitors in series with each other and in parallel with said first circuit and said second circuit, the junction between said two capacitors being connected to said center tap; and the equivalent of two input capacitors in series with each other with their common junction connected to said center tap, said inductor winding means comprising two inductor windings, one of said two inductor windings having one end connected to the junction between said first switch and said first diode and having its other end connected to a source of voltage and to one end of said two input capacitors in series with each other, the other of said two inductor windings having one end connected to the parallel combination of said first circuit and said second circuit and having its other end connected to the other end of said two input capacitors in series with each other.

12. An integrated magnetics power converter, comprising: a core having at least three legs including a center leg which is closer to one of two outer legs; primary winding means and a secondary winding means of a transformer passing around said one outer leg; an inductor winding passing around the other outer leg; a first circuit of a first diode in series with a first switch, said inductor winding having one end connected to the junction between said first diode and said first switch, the other end of said inductor winding being adapted to be connected to a source of voltage; a second circuit of a second diode in series with a second switch, one end of said primary winding means being joined to the junction between said first diode and said first switch and the other end being joined to the junction between said second diode and said second switch; capacitor means in parallel with said first circuit and said second circuit; and a third switch across said first switch which is closed when said first switch and said second switch are open.

13. The apparatus of claim 12, further including a third diode which is in series with said third switch, the series combination of said third diode and third switch being in parallel with said first switch.

14. The converter of claim 13, wherein said third switch is a MOSFET transistor and said another diode is a SCHOTTKY diode.

15. An integrated magnetics power converter, comprising:
a magnetic core;
primary winding means and secondary winding means, carried by one part of said core, for a transformer;
inductor winding means, carried by another part of said core, for developing flux in said one part of said core to oppose the direction of flux developed by said primary winding means;
a first series circuit comprising said inductor winding means having one end connected to one end of a biasing diode and comprising a first switch connected to the other end of said biasing diode, the other end of said inductor winding means being adapted to be connected to a voltage source;
a second series circuit comprising a reset winding having one end connected to one end of a first diode and comprising a second switch having one end connected to the other end of said first diode, said primary winding having one end connected to the junction between said biasing diode and said first switch and having its other end connected to the other end of said second switch;
capacitor means across said reset winding and said first diode; and
a second diode connecting the junction between said first diode and said reset winding with the junction between said inductor winding and said biasing diode.

16. The converter of claim 15, wherein said core has at least three legs to define at least part of two winding windows of unequal area; wherein said transformer is carried on one leg such that said primary winding means and said secondary winding means passes through the smaller winding window; and wherein said inductor winding means is carried on an opposite leg and passes through the larger winding window.

17. An integrated magnetics power converter, comprising: a magnetic core; a first inductor winding carried by said core and in series with one end of a first diode; a second inductor winding carried by said core and in series with one end of a second diode; a first switch connecting the junction between said first inductor winding and said first diode with the other end of said second diode; a second switch connecting the junction between said second inductor winding and said second diode with the other end of said first diode; and two capacitors in series with each other to connect said other ends of said first diode and said second diode, the common junction between said two capacitors and the free ends of said inductor windings defining the inputs of a boost section of the converter.

18. The converter of claim 17, further including primary transformer winding means on said magnetic core; and a buck circuit connected to said other ends of said first diode and said second diode, said buck circuit including said primary transformer winding means.

19. The converter of claim 18, wherein said primary winding means has a center tap connected to the junction between said two capacitors in series; and further including:
(a) two buck switches, each buck switch having one end connected to one end of said primary winding means and its other end connected to said other end of one of said first and second diodes; and (b) a third and a fourth diode, each having one end connected to the junction between said one end of said primary winding and one buck switch and its other end connected to the other end of the other buck switch.

20. An integrated magnetics power converter, comprising: a magnetic core; a first inductor winding carried by said core and in series with one end of a first diode and a second inductor winding carried by said core and in series with one end of a second diode; a first switch connecting the junction between said first inductor winding and said first diode to the other end of said second diode; a second switch connecting the junction between said second inductor winding and said second diode to the other end of said first diode; two capacitors in series with each other and connected to said other ends of said first diode and said second diode; two primary windings on said core; and a third diode and a fourth diode, one end of one primary winding being connected to the junction between said first inductor winding and said first diode and with the other end connected by said third diode to the junction between said two capacitors in series, one end of the other primary winding being connected to the junction between said second inductor winding and said second diode and with the other end connected by said fourth diode to the junction between said two capacitors in series.

21. An integrated magnetics power converter, comprising: a magnetic core; a primary transformer winding carried by said core; a first inductor winding carried by said core and in series with one end of a first diode; a second inductor winding in series with one end of a second diode; capacitor means for connecting together the other ends of said first diode and said second diode; an isolation diode connected to one end of said primary transformer winding; and two switches, the other end of said primary transformer winding being connected by a first switch to said other end of said first diode, the other end of said isolation diode being connected by a second switch to said other end of said second diode.

22. A converter, comprising: a magnetic core defining in cross-section at least two windows; primary winding means and secondary winding means of a transformer passing through one window, said primary winding means comprising two primary windings joined in series with each other and wound in the same sense; at least one inductor winding passing through the other window, said windings being wound relative to each other such that the phasing of said inductor winding opposes the direction of flux developed by said two primary windings; a first switch having one end connected to one end of one primary winding, the other end of said one primary winding being connected at a common junction to one end of the other primary winding, said first switch and said one primary winding defining a first series circuit, said first series circuit being adapted to receive a voltage source across the other end of said first switch and the other end of said one primary winding; and a second switch in series with said one inductor winding to define a second series circuit which is in parallel with said two primary windings and said first switch.

23. The converter of claim 22, wherein said secondary winding means comprises two secondary windings wound in the same sense, each secondary winding having one end connected to a common ground; and further including a another inductor winding and two diodes, each diode connecting one end of said another inductor winding with one of the other ends of said two secondary windings.

24. The converter of claim 23, further including a network in parallel with said another inductor winding, said network comprising a resistor and capacitor in parallel with each other and in series with a third diode.

25. An integrated magnetics power converter, comprising: a magnetic core defining in cross-section at least two winding windows; at least one primary winding and one secondary winding of a transformer passing through the one winding window; at least one inductor winding passing through another winding window, said windings being wound relative to each other such that the flux of said inductor winding opposes the direction of flux developed by said primary winding; a first series circuit comprising one switch in series with said inductor winding, said first series circuit being adapted to be connected across a voltage source; and a second series circuit in parallel with said first switch, said second series circuit comprising a second switch and said primary winding.

26. The converter of claim 25, wherein said first switch and said second switch have a different duty cycle and wherein the ratio of the output voltage of the converter to the input voltage is equal to ratio of the turns on said secondary winding to the product of the turns on said primary winding and the duty cycle of the second switch.

27. An integrated magnetics power converter, comprising: a generally rectangular magnetic core having at least two winding windows; a primary winding and a secondary winding of a transformer passing through one winding window; an inductor winding passing through another winding window, said windings being wound relative to each other such that the phasing of said inductor winding opposes the direction of flux developed by said primary winding; a first switch in series with said primary winding to define a first series circuit; and a second switch in series with said inductor winding to define a second series circuit, said first series circuit being in parallel with said second series circuit and adapted to be connected across a source of DC-voltage.

28. The integrated magnetics power converter of claim 27, wherein said magnetic core has only two winding windows of unequal area.

29. A converter having a boost stage in series with a buck stage, comprising:
a magnetic core having one bobbin means around which power transformer windings are wound and another bobbin means around which inductor windings are wound so as to form an integrated magnetics assembly, said magnetic core having only two winding windows of unequal area and three legs of unequal cross sectional area with the leg having the largest cross sectional area defining an air gap, said power transformer windings including a primary winding, said power transformer windings and said inductor windings being wound relative to each other such that the flux of said inductor windings opposes the direction of flux developed by said power transformer windings in the leg of smallest cross section;
switching means for controlling the flow of current through said primary winding, said switching means comprising:

(a) a first circuit for joining a node to a circuit ground using a first diode in series with a first switch, (b) a second circuit of a second diode having one end joined to one end of a second switch, said first diode and the other end of said second switch being joined to said node and said first switch and said second switch having the same duty cycle, (c) means, using at least part of said inductor windings, for supplying DC current to the junction between said first diode and said first switch, and (d) capacitor means in parallel with said first circuit, said primary winding of said transformer joining said junction between said first switch and said first diode to the junction between said second switch and said second diode; and operating means for operating said switching means in a continuous mode of energy storage under minimum output loading conditions while providing adequate time for removing the magnetization energy of the transformer part of said integrated magnetics assembly, said operating means comprising:

(a) resistor means; and (b) capacitor means in parallel with said resistor means for joining the other end of said second diode to said junction between said first switch said first diode.

30. A converter, comprising:

a magnetic core having one bobbin means around which power transformer windings are wound and another bobbin means around which inductor windings are wound so as to form an integrated magnetics assembly, said power transformer windings including a center tapped primary winding said inductor windings and core forming a first inductor and a second inductor;

switching means for controlling the flow of current through said primary winding, said switching means comprising: one switch having one end connected to one end of said center tapped primary winding, a second switch with one end connected to the other end of said center tapped primary winding, a first diode which connects the other end of said first switch to said other end of said primary winding, and a second diode which connects the other end of said second switch to said one end of said primary winding; and operating means for operating said switching means in a continuous mode of energy storage under minimum output loading conditions while providing adequate time for removing the magnetization energy of the transformer part of said integrated magnetics assembly, said operating means comprising:

(a) a third diode having one end connected to one end of said first inductor, said third diode having its other end connected to said other end of said second switch;

(b) a fourth diode having one end connected to one end of said second inductor, said fourth diode having its other end connected to said other end of said first switch;

(c) capacitive means for capacitively coupling said other ends of said third and fourth diodes to said center tap of said primary winding;

(d) a third switch connecting said one end of said third diode to said other end of said fourth diode; and (e) a fourth switch connecting said one end of said fourth diode to said other end of said third diode.

31. The converter of claim 30, wherein said capacitive means is two capacitors in series with each other and said center tap is connected to the common junction between said two capacitors in series.

32. An integrated magnetics power converter, comprising:

a magnetic core having two winding windows of unequal area; at least one primary winding and one secondary winding of a transformer passing through the smaller winding window; an inductor winding passing through the larger of the two winding windows, said windings being wound relative to each other such that the flux of said inductor winding opposes the direction of flux developed by said primary winding; a first circuit of a first diode in series with a first switch, said primary winding having one end joined to the junction between said first diode and said first switch; a second circuit of a second diode in series with a second switch, said primary winding having its other end joined to the junction between said second diode and said second switch, and capacitor means in parallel with said first circuit and said second circuit, said inductor winding having one end connected to the junction between one diode and its switch, and the other end being adapted to be connected to a source of voltage.

33. The converter of claim 32, further including: a third diode for joining said one end of said inductor winding to the junction between said one diode and its switch; and a fourth diode for joining said one end of said inductor winding to the common junction of one of said first and second circuits and said capacitor means.

34. An integrated magnetics power converter, comprising: a magnetic core; primary winding means of a transformer comprising two primary windings wound in opposite directions on said core; secondary winding means of said transformer on said core; inductor winding means on said core comprising two inductor windings wound in opposite directions;

a first series circuit of a diode in series with one primary winding;

a second series circuit of a first switch in series the other primary winding;

capacitor means in parallel with said first series circuit and said second series circuit;

one inductor in series with a second switch to charge said capacitor means and in series a third switch to ground;

a third series circuit comprising a fourth switch in series with said secondary winding means; and a fourth series circuit comprising a fifth switch in series with the other inductor winding.

35. The converter of claim 34, further including an output capacitor in parallel with said third series circuit and said fourth series circuit.

36. The converter of claim 34, wherein said first switch, second switch and said fourth switch have one duty cycle and said first switch and said fifth switch have another duty cycle.

37. The converter of claim 36, wherein said duty cycles are complementary.

38. An integrated magnetics power converter, comprising: a core having at least two winding windows and three flux legs, with one of said legs defining an air gap; a first series circuit of one primary winding which is carried by said core and which is in series with a switch, across which voltage is inputted; a secondary winding which is carried by said core and which is in series with one diode, across which voltage is outputted; inductor winding means which is carried by said core and which is in series with a second diode, across which is applied said voltage output; and reset winding means in series with an inductor and a capacitor and both in parallel with said second diode.

39. The converter of claim 38, wherein said inductor winding means comprises two inductor windings in series with each other with one inductor winding on the same leg as said primary winding and with the other inductor winding on the same leg as said secondary winding.

40. The converter of claim 38, wherein said reset winding means comprises two reset windings in series with each other with one reset winding on the same leg as said primary winding and with the other reset winding on the same leg as said secondary winding.

41. The converter of claim 38, further including: another secondary winding in series with a third diode and on the same leg as said primary winding, said another secondary winding and said secondary winding being wound in the opposite sense; and another primary winding in series with a second switch and on the same leg as said secondary winding, said primary winding and another primary winding being wound in the opposite sense.

42. The converter of claim 38, further including: two split inductor windings on said core and in series with said first series circuit, across which voltage is inputed; and a second series circuit, in parallel with said first series circuit, comprising a second primary winding in series with a second switch.

43. The converter of claim 42, further including: a third switch which joins said first series circuit to said two split inductor windings; and a fourth switch which joins said one second series circuit to said two split inductor windings.

44. A power converter, comprising:
a magnetic core having only two winding windows of unequal area and three legs of unequal cross sectional area with the leg having the largest cross sectional area defining an air gap;
a buck stage having windings of transformer means passing around the leg with the smallest cross sectional area and through only the one winding window with the smaller area to form a transformer core leg, and
a boost stage for supplying said buck stage, said boost stage having the same duty cycle as said buck stage and having windings of inductor means passing through only the other winding window, said windings of said inductor means being wound relative to said windings of said transformer means about said core such that the flux of said inductor means opposes the direction of flux developed by said transformer means in said transformer core leg and increases the available flux for transformer action, said boost stage comprising:
(a) first inductor means having one end in series with one end of a first diode;
(b) second inductor means having one end in series with one end of a second diode, said first inductor means and said second inductor means being carried by said leg with the largest cross sectional area;
(c) a first switch connecting the junction between said first inductor means and said first diode with the other end of said second diode;
(d) a second switch connecting the junction between said second inductor means and said second diode with the other end of said first diode; and
(e) capacitor means for capacitively connecting said other ends of said first diode and said second diode to a common node, the input to said boost stage being applied between said common node and the other ends of said first inductor means and said second inductor means.

45. A converter, comprising:
a magnetic core having one bobbin means around which power transformer windings are wound and another bobbin means around which inductor windings are wound so as to form an integrated magnetics assembly, said inductor winding and said core comprising a first inductor and a second inductor, said power transformer windings including a primary winding;
switching means for controlling the flow of current through said primary winding; and
operating means for operating said switching means in a continuous mode of energy storage under minimum output loading conditions while providing adequate time for removing the magnetization energy of the transformer part of said integrated magnetics assembly, said operating means comprising a diode in series with said primary winding to form a primary circuit,
said switching means comprising:
(a) said first inductor in series with a first diode and a first switch and joined to one end of said primary circuit;
(b) said second inductor in series with a second diode and a second switch and joined to the other end of said primary circuit;
(c) means for joining the junction between said first diode and said first inductor to said other end of said primary circuit;
(d) means for joining the junction between said second diode and said second inductor to said one end of said primary circuit; and
(e) means for capacitively coupling said junction between said first diode and said first switch to said junction between said second diode and said second switch.

46. An integrated magnetics power converter, comprising: a first inductor in series with one end of a first diode; a second inductor in series with one end of a second diode; a first switch connecting the junction between said first inductor and said first diode with the other end of said second diode; a second switch connecting the junction between said second inductor and said second diode with the other end of said first diode; means, comprising the equivalent of two capacitors in series with each other, for connecting said other ends of said first diode and said second diode; a primary transformer winding having a center tap connected to the junction between said two capacitors in series, said primary transformer winding and said first inductor and said second inductor sharing the same core; two buck switches, each connecting one end of said primary winding with one of said other ends of said first and second diodes; and a third and fourth diode, each connected between the junction between said one end of said primary winding and one buck switch and to the other end of the other buck switch.

47. An integrated magnetics power converter, comprising: a first inductor in series with one end of a first diode; a second inductor in series with one end of a second diode, said first inductor and said second inductor being carried by the same core; a first switch connecting the junction between said first inductor and said first diode with the other end of said second diode; a second switch connecting the junction between said second inductor and said second diode with the other end of said first diode; connecting means, equivalent to two capacitors in series with each other, for connecting said other ends of said first diode and said second diode; a transformer having two primary windings on said core, each primary winding having an end connected to the junction between one inductor and its diode; and means, equivalent to a third and fourth diode, for connecting the junction between said equivalent of two capacitors in series and one of the other ends of said two primary windings.

48. A converter, comprising:
a magnetic core having one bobbin means around which power transformer windings are wound and another bobbin means around which inductor windings are wound so as to form an integrated magnetics assembly, said power transformer windings including a primary winding;
switching means for controlling the flow of current through said primary winding; and
operating means for operating said switching means in a continuous mode of energy storage under minimum output loading conditions while providing adequate time for removing the magnetization energy of the transformer part of said integrated magnetics assembly, said operating means comprising a dissipative averaging reset circuit in parallel with said primary winding.

49. The converter of claim 48, wherein said dissipative averaging circuit comprises a diode in series with the parallel combination of a capacitor and a resistor.

50. A converter, comprising:
a magnetic core having one bobbin means around which power transformer windings are wound and another bobbin means around which inductor windings are wound so as to form an integrated magnetics assembly, said power transformer windings including a primary winding;
switching means for controlling the flow of current through said primary winding, said switching means comprising a first circuit of a first diode in series with a first switch and comprising a second circuit of a second diode in series with a second switch with said primary winding of said transformer joining the junction between said first switch and said first diode to the junction between said second switch and said second diode; and
operating means for operating said switching means in a continuous mode of energy storage under minimum output loading conditions while providing adequate time for removing the magnetization energy of the transformer part of said integrated magnetics assembly, said operating means comprising a third circuit of a third switch in series with a third diode, said third circuit being in parallel with said first diode, said third switch being closed when said first and second switches are open.

51. A converter, comprising:
a magnetic core having one bobbin means around which power transformer windings are wound and another bobbin means around which inductor windings are wound so as to form an integrated magnetics assembly, said power transformer windings including a primary winding;
switching means for controlling the flow of current through said primary winding, said switching means comprising a first circuit of a first diode in series with a first switch and comprising a second circuit of a second diode in series with a second switch, said primary winding of said transformer joining the junction between said first switch and said first diode to the junction between said second switch and said second diode; and
operating means for operating said switching means in a continuous mode of energy storage under minimum output loading conditions while providing adequate time for removing the magnetization energy of the transformer part of said integrated magnetics assembly, said operating means comprising means for providing bi-directional path around said first diode.

52. A converter, comprising:
a magnetic core having one bobbin means around which power transformer windings are wound and another bobbin means around which inductor windings are wound so as to form an integrated magnetics assembly, said power transformer windings including a primary winding;
switching means for controlling the flow of current through said primary winding; and
operating means for operating said switching means in a continuous mode of energy storage under minimum output loading conditions while providing adequate time for removing the magnetization energy of the transformer part of said integrated magnetics assembly, said operating means comprising a reset winding on said one bobbin means with sufficient turns to shorten the reset time of said transformer windings.

53. The converter of claim 52, wherein said switching means comprises: a first circuit of a first switch connected to one end of said primary winding and a second switch connected to the opposite end of said primary winding; a capacitor in parallel with said first circuit; and a second circuit, in parallel with said capacitor, of a first diode in series with said reset winding.

54. The converter of claim 53, further including one inductor winding with one end adapted to be connected to the converter input and an opposite end joined by a second diode to the junction between said first switch and said primary winding and joined by a third diode to the other end of said second switch.

55. A converter having a boost stage in series with a buck stage, comprising:
a magnetic core having one bobbin means around which power transformer windings are wound and another bobbin means around which inductor windings are wound so as to form an integrated magnetics assembly, said magnetic core having only two winding windows of unequal area and three legs of unequal cross sectional area with the leg having the largest cross sectional area defining an air gap, said power transformer windings including a primary winding, said power transformer windings and said inductor windings being wound relative to each other such that the flux of said inductor windings opposes the direction of flux developed by said power transformer windings;

switching means for controlling the flow of current through said primary winding, said switching means comprising:
 (a) a first circuit for joining a node to a circuit ground using a first diode in series with a first switch,
 (b) a second circuit for joining said node to said circuit ground using a second diode in series with a second switch, said first diode and said second switch being joined to said node and said first switch and said second switch having the same duty cycle,
 (c) means, using at least part of said inductor windings, for supplying DC current to the junction between said first diode and said first switch, and
 (d) capacitor means in parallel with said first circuit and said second circuit, said primary winding of said transformer joining the junction between said first switch and said first diode to the junction between said second switch and said second diode; and operating means for operating said switching means in a continuous mode of energy storage under minimum output loading conditions while providing adequate time for removing the magnetization energy of the transformer part of said integrated magnetics assembly, said operating means comprising:
 (a) Schottky diode means joined at one of its ends to said node; and
 (b) MOSFET means, in series with said Schottky diode means and joined to said junction between said first switch and said first diode, for providing a bi-directional path in said first circuit, said MOSFET means being gated when said first switch and said second switch are in an OFF condition.

* * * * *